(12) United States Patent
Majoros et al.

(10) Patent No.: US 10,715,613 B2
(45) Date of Patent: Jul. 14, 2020

(54) PRESENCE INDICATORS

(71) Applicant: Microsoft Technology Licensing, LLC, Redmond, WA (US)

(72) Inventors: Jack Henry Majoros, San Francisco, CA (US); Jingwei Huang, Campbell, CA (US); Haowen Ning, Sunnyvale, CA (US); Christopher Szeto, Mountain View, CA (US); Sammy Shreibati, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 15/962,027

(22) Filed: Apr. 25, 2018

(65) Prior Publication Data
US 2019/0335008 A1    Oct. 31, 2019

(51) Int. Cl.
| H04L 12/28 | (2006.01) |
| H04L 29/08 | (2006.01) |
| H04L 29/06 | (2006.01) |
| H04L 12/58 | (2006.01) |
| H04W 4/21 | (2018.01) |

(52) U.S. Cl.
CPC ............. *H04L 67/24* (2013.01); *H04L 51/32* (2013.01); *H04L 65/40* (2013.01); *H04L 67/22* (2013.01); *H04L 67/2842* (2013.01); *H04L 67/306* (2013.01); *H04W 4/21* (2018.02)

(58) Field of Classification Search
None
See application file for complete search history.

(56) References Cited

U.S. PATENT DOCUMENTS

| 7,783,786 B1* | 8/2010 | Lauterbach | ......... H04L 67/1095 709/238 |
| 2004/0141606 A1* | 7/2004 | Torvinen | ........... H04M 3/42374 379/202.01 |
| 2008/0019300 A1* | 1/2008 | Perzy | .................. H04L 12/1822 370/328 |
| 2008/0201419 A1* | 8/2008 | Hung | ...................... H04L 51/04 709/204 |
| 2009/0106677 A1* | 4/2009 | Son | ......................... H04L 67/24 715/764 |
| 2012/0102150 A1* | 4/2012 | Wang | ...................... H04L 67/24 709/217 |
| 2012/0117157 A1* | 5/2012 | Ristock | .................. G06Q 10/10 709/205 |

* cited by examiner

*Primary Examiner* — Elisabeth Benoit Magloire
(74) *Attorney, Agent, or Firm* — Schwegman Lundberg & Woessner, P.A.

(57) ABSTRACT

Disclosed are systems, methods, and non-transitory computer-readable media for batching requests for presence information. A client device determines a set of user indicators that are displayed on a display of the client device during a period of time. Each user indicator corresponds to a user of an online service, and is presented on the display as a result of a user of the client device viewing content provided by the online service. At completion of the period of time, the client device determines a set of remaining user indicators displayed on the display of the client device, and transmits, to a server associated with the online service, a batched request for presence information for a set of users corresponding to the set of remaining user indicators. The client device presents presence indicators indicating the status of the users based on the requested presence information.

18 Claims, 12 Drawing Sheets

PRESENCE INDICATORS

TECHNICAL FIELD

An embodiment of the invention relates generally to presence indicators and, more specifically, to reducing resource usage when providing for presence indicators.

BACKGROUND

Online services, such as social networking sites, news sites, etc., allow users to interact with each other online. For example, users can post public messages, comments, articles, songs, etc., that are visible by other users of the online service. Users may also add reply comments to existing posts to create an online dialogue with other users. In addition to these public conversations, many sites allow for private direct messaging between users. To encourage users to engage in online conversations, status indicators may be presented that indicate whether the other users are currently logged into the online service and available to converse. For example, a status indicator may be presented next to a name of the user and/or a user interface element that allows a user to engage in a conversation with the other user. This allows a user to quickly determine whether another user is currently using the online service and thus available to converse, One issue with providing these types of status indicators is scalability. With the high number of users using online services, providing status indicators for each of them is resource intensive. For example, to determine the status of a user, a device transmits a request to a server. This process is repeated periodically to obtain updated status information for each user, thereby further increasing the number of requests transmitted to the server. Sending these requests for each user is unsustainable when dealing with a high number of users. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
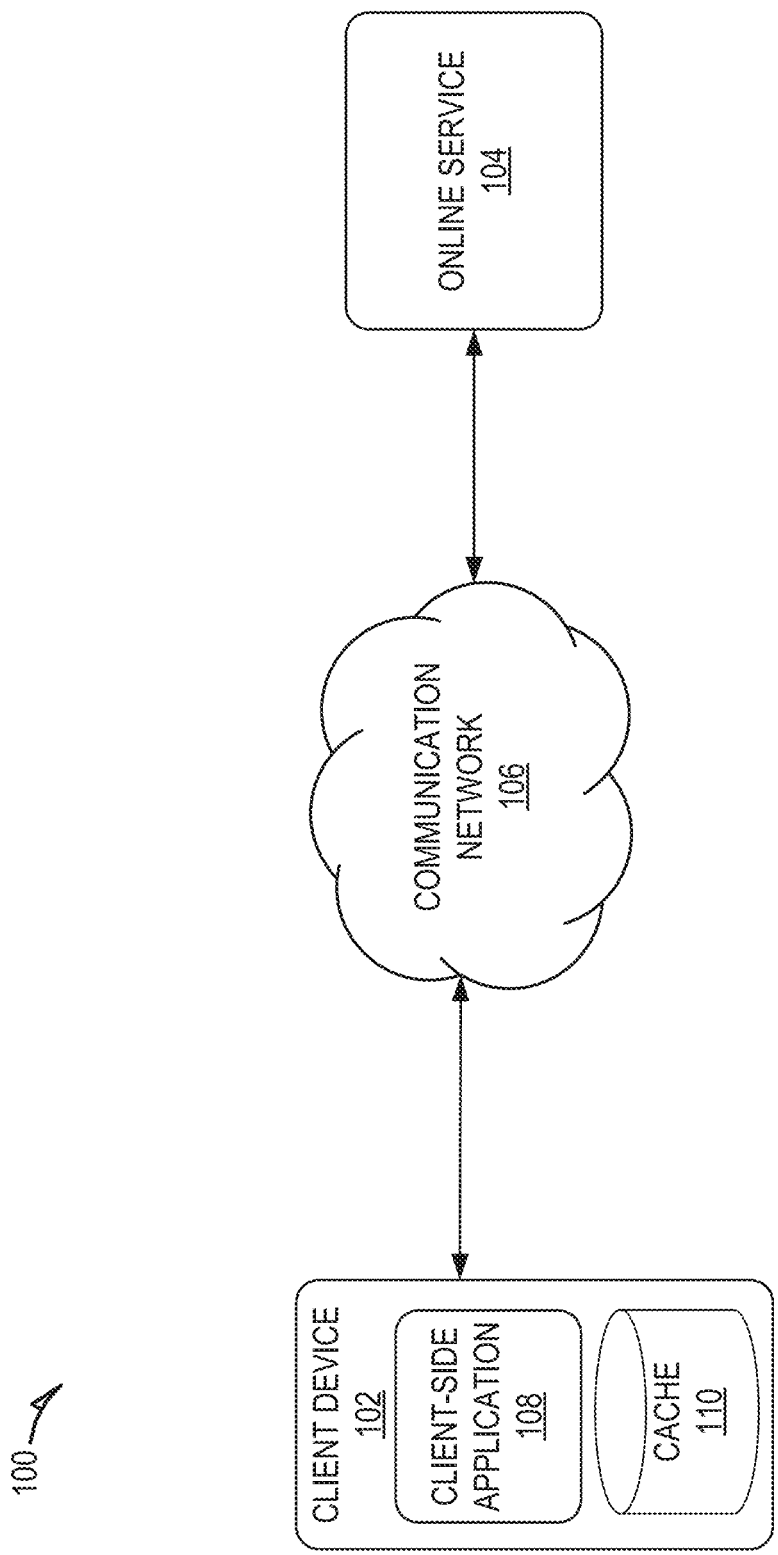
FIG. 1 shows a system configuration, wherein electronic devices communicate via a network for purposes of exchanging data, according to some example embodiments.

In the following description, for purposes of explanation, various details are set forth in order to provide a thorough understanding of various embodiments of the invention. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for reducing resource usage when providing for presence indicators. Online services, such as social networking services (e.g., LinkedIn, Facebook, etc.), allow users to communicate with each other online, either through public conversations (e.g., posting comments, replying to comments, etc.), or through private conversations using direct messaging. To encourage conversations between users, presence indicators that indicate a user's status (e.g., online, offline, or available to receive a notification) are presented by the online service. The presence indicators allow users of the online service to easily determine whether another user is online and available to converse, which may increase the likelihood of the users engaging in a private or public conversations.

Presence indicators are presented near or along with corresponding user indicators that identify users of the online service. For example, a user indicator may be a profile picture of the user, a listing of the user's name, etc. A presence indicator presented near or along with a corresponding user indicator indicates the status of the user of the online service that is represented by the user indicator.

User indicators are presented throughout content presented by an online service. For example, user indicators are presented along with comments, posts, replies, etc., to identify the user that authored the comment, post, reply, etc. User indicators may also be listed to identify a user's contacts, friends, connections, etc. Accordingly, the set of user indicators that are presented on a display changes as a user navigates through content provided by the online service. For example, as a user scrolls through their news feed, new user indicators are presented on the display, while others that were presented on the display are removed.

As user indicators becomes present on the display of a client device, the client device determines the presence status of the corresponding users and presents presence indicators indicating the determined presence statuses. To determine the presence status of a user, the client device transmits a request to the online service (e.g., server of the online service) for the presence status of the user. In response, the online service returns the requested user's presence status, which is then presented on the display. Transmitting a request each time a user indicator is presented on the display results in a larger number of requests, which may not be sustainable.

To minimize the number of requests, the client device batches the requests for a period of time. That is, the client device determines a set of user indicators that are displayed on a display of the client device at any point during the period of time. At the conclusion of the period of time, the client device determines a set of the user indicators that remain presented on the display, and transmits a batched request for the presence statuses of the corresponding users to the online service. Batching the requests reduces resource usage by transmitting a single request for multiple presence statuses rather than multiple requests each for a single presence status. Further, the client device does not request the presence status for user indicators that are no longer present on the display at the conclusion of the period of time. As a result, the client device does not request presence status for a user indicator that was quickly displayed as a user scrolls through a news feed, comments, etc.

In addition to batching the requests, the client device also reduces resource usage by caching the presence statuses in a local cache memory of the client device. Caching the presence statuses allows the client device to gather the presence status for some users from the local cache memory, rather than transmitting a request to the online service. For example, the client device first determines whether the presences status of a user is available from the cache memory, and transmits a request to online service when the presence status is not available from the cache memory or the cached presence status is outdated.

FIG. 1 shows an example system configuration 100, wherein electronic devices communicate via a network for purposes of exchanging data, according to some example embodiments. As shown, multiple devices (i.e., a client device 102 and an online service 104) are connected to a communication network 104 and configured to communicate with each other through use of the communication network 104. The communication network 104 is any type of network, including a local area network ("LAN"), such as an intranet, a wide area network ("WAN"), such as the Internet, or any combination thereof. Further, the communication network 104 may be a public network, a private network, or a combination thereof. The communication network 104 is implemented using any number of communication links associated with one or more service providers, including one or more wired communication links, one or more wireless communication links, or any combination thereof. Additionally, the communication network 104 is configured to support the transmission of data formatted using any number of protocols.

Multiple computing devices can be connected to the communication network 104. A computing device is any type of general computing device capable of network communication with other computing devices. For example, a computing device can be a personal computing device such as a desktop or workstation, a business server, or a portable computing device, such as a laptop, smart phone, or a tablet Personal Computer (PC). A computing device can include some or all of the features, components, and peripherals of the machine 900 shown in FIG. 9.

To facilitate communication with other computing devices, a computing device includes a communication interface configured to receive a communication; such as a request, data, etc., from another computing device in network communication with the computing device and pass the communication along to an appropriate processing module executing on the computing device. The communication interface also sends a communication (e.g., transmits data) to other computing devices in network communication with the computing device.

In the system 100, users interact with the online service 104 to utilize the functionality provided by the online service 104. For example, a user uses the client device 102 connected to the communication network 106 by direct and/or indirect communication to communicate with and utilize the functionality of the online service 104. The online service 104 provides any of a number of online services in which users can communicate via public or private conversations. For example, the online service 104 may provide a social networking service where users may connect with other users, post articles, comments, share songs, direct message, etc. As another example, the online service 104 provides a news service where users can access and read articles, as well as post comments and respond to other comments.

Although the shown system 100 includes only one client device 102, this is only for ease of explanation and is not meant to be limiting. One skilled in the art would appreciate that the system 100 can include any number of client devices 102. Further, the online service 104 may concurrently accept connections from and interact with any number of client devices 102. The online service 104 supports connections from a variety of different types of client devices 102, such as desktop computers; mobile computers; mobile communication devices, e.g. mobile phones, smart phones, tablets; smart televisions; set-top boxes; and/or any other network-enabled computing devices. Hence, the client device 102 may be of varying type, capabilities, operating systems, etc.

A user interacts with the online service 104 via a client-side application 108 installed on and executing at the client device 102. In some embodiments, the client-side application 108 includes an online service 104 system specific component. For example, the component may be a stand-alone application, one or more application plug-ins, and/or a browser extension. However, the client-side application 108 may also be a third-party application, such as a web browser, that resides on the client device 102 and is configured to communicate with the online service 104. In either case, the client-side application 108 presents a user interface (UI) for the user to interact with the online service 104. For example, the user interacts with the online service 104 via the client-side application 108 integrated with the file system or via a webpage displayed by a web browser application.

The online service 104 comprises one or more computing devices configured to provide an online service that enables users to engage in public and/or private conversations. A public conversations is communication that includes messages that are posted publicly, and can be viewed by and participated by other users. For example, a comments section of an article is a public conversation where users can post comments that are visible to other users, as well as reply to comments posted by other users. As another example, posts made on a social networking site and comments/replies to the post are a public conversation. A private conversation, in contrast is communication between a pre-determined set of participants that can be only be viewed and participated in by the participants. For example, direct messages between a group of two or more users is a private conversation.

To encourage users of the online service to engage in conversations, both private and public, the online service 104 provides presence indicators that indicate a user's presence status (e.g., online, offline, available to receive a notification, away, etc.). The presence indicators allow users of the online service 104 to easily determine whether another user is online and available to converse, which may increase the likelihood of the users engaging in a private or public conversations.

Presence indicators are presented near or along with corresponding user indicators that identify users of the online service. For example, a user indicator may be a profile picture of the user, a listing of the user's name, etc. A presence indicator, such as a dot, presented near or along with a corresponding user indicator indicates the status of the user of the online service 104 that is represented by the user indicator. For example, the dot is green to indicate that the corresponding user is online, the dot is yellow to indicate that the user is offline, and the dot is a green outline to indicate that the user is offline, but available to receive a notification, such as a push notification.

User indicators are presented throughout content presented by an online service. For example, user indicators are presented along with comments, posts, replies, etc., to identify the user that authored the comment, post, reply, etc. User indicators may also be listed to identify a user's contacts, friends, connections, etc. Accordingly, the set of user indicators that are presented on a display changes as a user navigates through content provided by the online service. For example, as a user scrolls through their news feed, comments, etc., new user indicators are presented on the display, while others that were presented on the display are removed.

As user indicators becomes present on the display of a client device 102, the client-side application 108 determines the presence status of the corresponding users and presents presence indicators indicating the determined presence statuses. To determine the presence status of a user, the client-side application 108 transmits a request to the online service 104 (e.g., server of the online service) for the presence status of the respective user. In response, the online service 104 returns the requested users presence status, which the client-side application 108 uses to cause a representative presence indicator to be presented on the display of the client device 102.

The online service 104 determines the presence status of users in any of a variety of known ways. For example, the online service 104 may maintain an activity log for users of the online service that indicates when a user last logged in, performed activity, etc. The online service 104 uses the activity log to determine whether the presence status of a user. For example, the online service 104 determines a period of elapsed time from a last recorded activity of the user to determine whether the user is still logged in and active, away, not logged in, etc. As another example, the online service 104 may transmit a message to a client device 102 of the user to determine whether the user is still actively logged into the online service 104.

With the high number of users of an online service 104, it may not be sustainable for the client-side application 108 to transmit a request to the online service 104 each time a user indicator is presented on the display of the client device 102. To minimize the number of requests, the client-side application 108 batches the requests for a period of time. That is, the client-side application 108 determines a set of user indicators that are displayed on the display of the client device 102 at any point during the period of time. At the conclusion of the period of time, the client-side application 108 determines a set of the user indicators that remain presented on the display, and transmits a batched request for the presence statuses of the corresponding users to the online service 104. Batching the requests reduces resource usage by transmitting a single request for multiple presence statuses rather than multiple requests each for a single presence status. Further, the client-side application 108 does not request the presence status for user indicators that are no longer present on the display at the conclusion of the period of time. As a result, the client-side application 108 does not request presence status for a user indicator that was quickly displayed as a user scrolls through a news feed, comments, etc., thereby, further reducing the number of presence requests.

In addition to batching the requests, the client-side application 108 also reduces resource usage by caching the presence statuses in a local cache memory 110 of the client device 102. Caching the presence statuses allows the client-side application 108 to gather the presence status for some users from the local cache memory 110, rather than transmitting a request to the online service 104. For example, the client-side application 108 first determines whether the presence status of a user is available from the cache memory 110, and transmits a request to the online service 104 when the presence status is not available from the cache memory 110 or the cached presence status is outdated. A user's cached presence status is determined to be outdated if it hasn't been updated for a threshold period of time.

To maintain updated cached presence information, the client-side application 108 may request that the online service 104 push real-time presence updates to the client device 102. For example, the client-side application 108 transmits a real-time presence subscription request to the online service 104 for presence status updates of a specified user. As a result, the online service 104 pushes presence status updates of the specified user to the client device 102, rather that the client-side application 108 continuously requesting an updated presence status from the online service 104. Once the client-side application 108 has subscribed to receive real-time presence status updates for a specified user, the online service 104 monitors the presence status of the specified user and transmit updates to the client device 102 in the event that the specified user's presence status has changed. The cached presence status for the specified user is updated according to presence status updates received from the online service 104. As a result, the cached presence status for the specified user will remain continuously updated.

Subscribing to receive real-time presence status updates for a large number of users may be resource intensive. Accordingly, the client-side application 108 limits the number of subscriptions based on a threshold number. To maximize the value of the allotted subscriptions, the client-side application 108 maintains subscriptions associated with users that are recently and/or commonly requested, and ends subscriptions associates with users that have not been recently requested.

Figure 2:
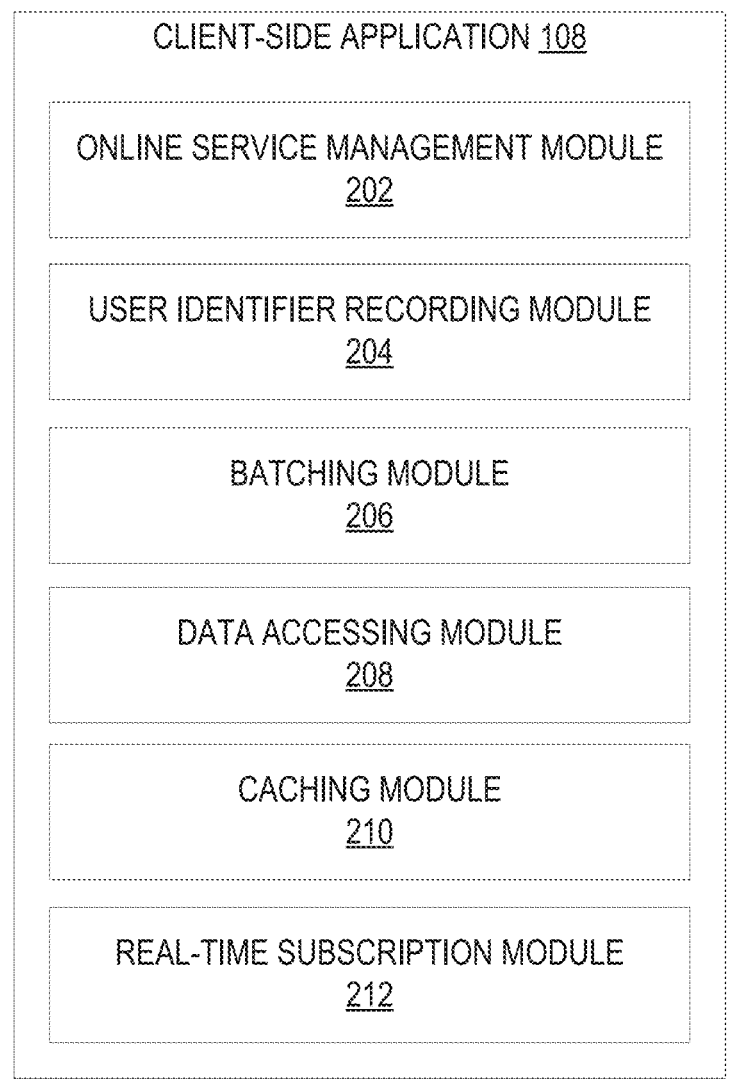
FIG. 2 is a block diagram of a client-side application, according to some example embodiments.

FIG. 2 is a block diagram of the client-side application 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the client-side application 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the client-side application 108 includes an online service management module 202, a user indicator recording module 204, a batching module 206, a data accessing module 208, a caching module 210, and a real-time subscription module 212.

The online service management module 202 provides general functionality of the online service 104. As explained above, the online service 104 provides any of a number of online services in which users can communicate via public or private conversations. For example, the online service 104 may provide a social networking service where users may connect with other users (e.g., become friends, connections, etc.), view posted content (e.g., articles, status updated, etc.), post articles, comment on existing posts, share songs, direct message with other users, etc. As another example, the online service 104 provides an online news service where users can access and read content (articles, videos, etc.) provided by the online news service, as well as post comments to the provided content and respond to previously posted comments.

To provide the general functionality of the online service 104, the online service management module 202 accesses content (e.g., articles, images, posts, comments, etc) from the online service 104, and presents the content on a display of the client device 102 (e.g., in a news feed). The online service management module 202 provides a user interface on the client device 102 that enables a user of the client device 102 to communicate with the online service 104 and utilize the functionality of the online service 104. For example, the user interface includes user interface elements, such as buttons, hyperlinks, scroll bars, text boxes, etc., that enable a user to browse content provided by the online service 104, post content, post comments, send direct messages to other users, read messages received from other users, etc. A user uses input devices of the client device 102 (e.g., a touch screen, physical buttons, keyboard, mouse, etc.) to select the various user interface elements to browse content and generally utilize the functionality provided by the online service 104. The online service management module 202 uses input received from a user to communicate with the online service 104. For instance, the online service management module 202 receives content, posts, etc., provided by a user and transmits the received content to the online service 104, where it may be made available to be viewed by other users of the online service.

Content provided by the online service 104 includes user indicators that identify users of the online service. A user of an online service is any user that accesses, posts, uses, and/or in any way engages with content and/or services provided by the online service 104. For instance, a user includes a user that has created a user account and/or profile with the online service 104, such as a user account and profile with a social networking service. The user indicators may be presented throughout content presented by an online service 104 to identify a corresponding user. For example, user indicators are presented along with comments, posts, replies, etc., to identify the user that authored the comment, post, reply, etc. User indicators may also be listed to identify a user's contacts, friends, connections, etc., in the online service 104. For example, the user indicators may, identify a listing of a user's friends on a social networking site.

The set of user indicators that are presented on a display of the client device 102 changes as a user navigates through content provided by the online service 104. For example, as a user scrolls through their news feed, new user indicators are presented on the display, while others that were presented on the display are removed. Likewise, as a user views a listing of their friends or connections on a social networking site, the user indicators that are presented changes as the user scrolls through the listing. For example, as the user scrolls down, some user indicators listed at the top of the listing are removed from display, while new user indicators appear at the bottom of the listing.

To encourage users of the online service to engage in conversations, the online service 104 provides presence indicators that indicate a user's status (e.g., online, offline; available to receive a notification, etc.). The presence indicators allow users of the online service 104 to easily determine whether another user is online and available to converse, which may increase the likelihood of the users engaging in a private or public conversations.

Presence indicators are presented near or along with corresponding user indicators that identify users of the online service. For example, a user indicator may be a profile picture of the user, a listing of the user's name, etc. A presence indicator, such as a dot, presented near or along with a corresponding user indicator indicates the status of the user of the online service 104 that is represented by the user indicator. For example, a green dot indicates that the corresponding user is online, a yellow dot indicates that the user is offline, a dot with a green outline indicates that the user is offline, but available to receive a notification, such as a push notification.

As user indicators becomes present on the display of a client device 102, the client-side application 108 determines the presence status of the corresponding users and presents presence indicators indicating the determined presence statuses. The user indicator recording module 204 monitors and records the user indicators that are presented and/or removed from the display of the client device 102. For example, the user indicator recording module 204 maintains an activity log that indicates when user indicators become present and are no longer present on the display of the client device. The activity log includes unique user identifiers assigned to the corresponding users, as well as time stamp data indicating a time when the user identifier become visible on the display of the client device, and time stamp data indicating a time when the user identifier was removed from the display.

To minimize the number of requests transmitted to the online service for presence information, the hatching module 206 batches the requests for a period of time. That is, the hatching module 206 determines a set of user indicators that are displayed on the display of the client device 102 at any point during the period of time. At the conclusion of the period of time, the batching module 206 determines a set of the user indicators that remain presented on the display, and causes a batched request for the presence statuses of the corresponding users to be transmitted to the online service 104. The hatching module 206 determines the user indicators that are/were presented from data gathered by the user identifier recording module 204. For example the user identifier recording module 204 may provide a listing of unique user identifiers for the user indicators, or the user identifier recording module 204 may access the activity log to determine the user indicators that are/were presented during the period of time.

Batching the requests reduces resource usage by transmitting a single request for multiple presence statuses rather than multiple requests each for a single presence status. Further, the client-side application 108 does not request the presence status for user indicators that are no longer present on the display at the conclusion of the period of time. As a result, the client-side application 108 does not request presence status for a user indicator that was quickly displayed as a user scrolls through a news feed, comments, etc., thereby further reducing the number of presence requests.

The batching module 206 may batch requests in a variety of ways. For instance, the batching module 206 may batch the requests based on predetermined time periods, such as 1 second, 2 seconds, 3 seconds, etc. In this type of embodiment, the hatching module 206 would batch the request based on the user indicators that were presented on the display during the predetermined time period. That is the hatching module 206 would determine the set of user indicators that were presented during the pre-determined period of time and identify a subset of the user indicators that remain present at the conclusion of the period of time.

The predetermined time periods may begin sequentially one after another. As another example, each predetermined time prior may begin once a new user indicator is presented on the display after a most recent request for presence statuses has been transmitted. In this type of embodiment, the predetermined time period may be initiated after a threshold time period has passed after a most recent request for presence statuses has been transmitted. This provides for updates status information even when a user is not actively navigating through content.

In some embodiments, the batching module 206 batches the requests based on a dynamic time period, rather than predetermined time periods. For example, the batching module 206 batches requests until a threshold inactivity period without a new user indicator appearing on the screen has elapsed. In the event that a new user indicator appears on the screen within the threshold inactivity period (i.e., the threshold inactivity period did not lapse without a new user indicator appearing on the screen), the threshold inactivity period resets.

The threshold inactivity period can be any length of time, such as a second, half of a second, etc. Further, the threshold inactivity period may be variable. For example, the threshold inactivity period may become shorter as it is continually reset. For example, the threshold period of time may initially be set at 1 second, and change to half a second after it has been reset 3 times. Batching the requests using a dynamic time period accounts for a user that is actively scrolling through content by waiting until the user has stopped actively scrolling for at least the threshold inactivity period to request presence statuses.

At the end of each period of time, whether it be predetermined or variable, the batching module 206 determines a subset of the user indicators that appeared on the display at any point during the period of time that remain presented on the display. The batching module 206 provides data identifying this remaining set of user indicators to the data accessing module 208. For example, the hatching module 206 provides the data accessing module 208 with the unique user identifiers corresponding to the user indicators in the remaining set of user indicators.

The data accessing module 208 uses the data provided by the batching module 206 (e.g., the unique user identifiers) to access presence information for the users corresponding to the unique user identifiers. The presence information identifies the presence statuses of the users. The data accessing module 208 may access the presence information for a user by transmitting a request to the online server 104. The request includes the unique user identifier for the user, which the online server 104 uses to identify the corresponding presence status. The online server 104 returns the requested presence information to the client-side application 108, which the online service management module 202 uses to present or update a presence indicator on the display of the client device 102.

To reduce the number of requests to the online service 104, the caching module 210 caches received presence information locally at the client device 102 in the cache memory 110. For example, upon the data accessing module 208 receiving presence information from the online service, the caching module 210 stores the received presence information in the cache memory 110. The caching module 210 stores the presence information along with the corresponding unique user identifier and timestamp data indicating the time at which the presence information was received.

The data accessing module 208 may access presence information for some users from the cache memory 110 rather than having to transmit a request to the online service 104. This reduces the number of requests to the online service 104, thereby reducing resource usage and increasing overall system performance.

The cache memory 110 includes two parts: an in-memory cache for short term memory status, and an on-disk cache for long term memory. The in-memory cache is used to store a user's current presence status, meaning whether the user is online. The on-disk cache is used to store long term presence status, such as whether the user is instantly available to receive direct messages, however this does not indicate whether the user is online/offline. Prior to transmitting a batched request to the online service, the data accessing module 208 determines whether the presence information for any of the users is stored locally in the cache memory 110. That is, whether the user's current presence status is in the in-memory cache. If so, the data accessing module 208 determines whether the stored presence information has been updated recently. For example, the data accessing module 208 searches the in-memory cache memory 110 for the unique user identifiers of the users and uses the timestamp data stored along with the presence information in the cache memory 110 to determine a time at which the presence information was last updated. If the data accessing module 208 determines that the current presence information for a user is available from the cache memory 110 and that the presence information has been updated within a threshold period of time, the data accessing module 208 accesses the presence information for the user from the cache memory 110, rather than from the online service 104. If the user's current presence information is not available from the in-memory cache, the data accessing module 208 checks the on-disk cache for the user's long term presence status, which is presented to the user. The data accessing module 208 requests the current presence information of the user from the online service 104. Using the on-disk cache allows for providing some level of presence information prior to requesting it from the online service 104.

In addition to transmitting one-time requests to the online service 104 for the presence information of a user, the client-side application 108 may also subscribe to receive real-time presence updates from the online service 104, Once subscribed to receive real-time presence status updates for a user, the online service 104 will monitor the presence status of a user and push updates to the client device 102. The caching module 210 uses the presence status updates to update the presence information stored in the cache memory. Accordingly, the client-side application 108 will receive updated status information for select users, rather than having to request the presence updates from the online service 104.

To reduce the resource usage associates with subscribing to receive real-time status updates, the client-side application 108 maintains up to maximum number of subscriptions. That is, the client-side application 108 subscribes to up to a maximum number of active subscriptions for real-time status updates for users. The real-time subscription module 212 manages subscriptions for real-time status updates. For example, the real-time subscription module 212 transmits requests to the online service 104 to subscribe for real-time status updates for user. The real-time subscription module 212 also deactivates active subscriptions for real-time status updates, for example, to make room for new subscriptions.

A request to subscribe for real-time status updates is made after presence information for a user is initially accessed from the online service 104 and stored in the cache memory 110. That is, a request to subscribe for real-time status updates of a user is performed in addition to at least the initial one-time request for presence information of the user. To optimize use of the subscriptions, the real-time subscription module 212 maintains a subscription listing that lists active subscriptions. The subscription listing is ordered based on how recently the presence information has been updates. For example, the presence information that has been updated most recently is listed at the top of the list, while the presence information that has gone the longest without being updated is listed at the bottom of the list.

In response to the data accessing module 208 accessing presence information for a user, either from the online service 104 or the cache memory 110, the real-time subscription module 212 determines whether an active subscription exists for the user and, if so, moves the presence information for user to the top of the subscription listing. Alternatively, if the real-time subscription module 212 determines that an active subscription for the user does not exist, the data accessing module 208 determines whether a threshold number of active subscriptions exist. If so, the real-time subscription module 212 deactivates the subscription from the bottom of the subscription listing (i.e.; the subscription that has gone the longest without being updated), and adds a new subscription for the user. Alternatively, if the threshold number of active subscriptions does not exist, the real-time subscription module 212 simply adds a new subscription for the user. The newly added subscription has the most recently updated presence information; and is therefore added to the top of the subscription listing.

Figure 3:
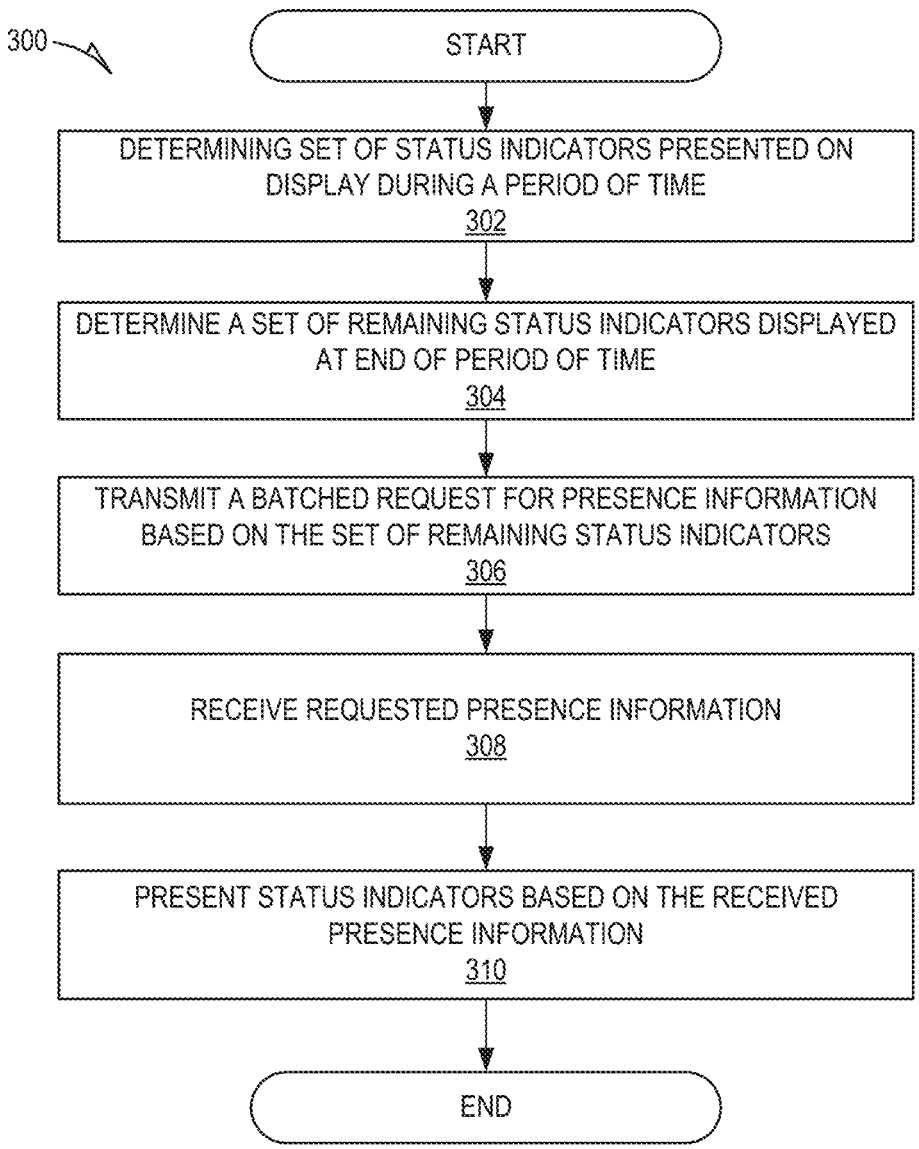
FIG. 3 is a flowchart showing an example method of presenting status indicators, according to certain example embodiments.

FIG. 3 is a flowchart showing an example method 300 of presenting status indicators, according to certain example embodiments. The method 300 may be embodied in computer readable instructions for execution by one or more processors such that the operations of the method 300 may be performed in part or in whole by the client-side application 108; accordingly, the method 300 is described below by way of example with reference thereto. However, it shall be appreciated that at least some of the operations of the method 300 may be deployed on various other hardware configurations and the method 300 is not intended to be limited to the client-side application 108.

At operation 302, the user identifier recording module 204 determines a set of status indicators presented on a display of a client device 102 during a period of time. The user indicator recording module 204 monitors and records the user indicators that are presented and/or removed from the display of the client device 102. For example, the user indicator recording module 204 maintains an activity log that indicates when user indicators become present and are no longer present on the display of the client device. The activity log includes unique user identifiers assigned to the corresponding users, as well as time stamp data indicating a time when the user identifier become visible on the display of the client device 102; and time stamp data indicating a time when the user identifier was removed from the display.

At operation 304, the hatching module 206 determines a set or remaining status indicators displayed at the end of the period of time. The batching module 206 determines the user indicators that are/were presented from data gathered by the user identifier recording module 204. For example the user identifier recording module 204 may provide a listing of unique user identifiers for the user indicators, or the user identifier recording module 204 may access the activity log to determine the user indicators that are/were presented during the period of time.

At operation 306, the batching module 206 transmits a batched request for presence information based on the set of remaining status indicators. Batching the requests reduces resource usage by transmitting a single request for multiple presence statuses rather than multiple requests each for a single presence status. Further, the client-side application 108 does not request the presence status for user indicators that are no longer present on the display at the conclusion of the period of time. As a result, the client-side application 108 does not request presence status for a user indicator that was quickly displayed as a user scrolls through a news feed, comments, etc., thereby further reducing the number of presence requests.

At operation 308, the batching module 206 receives the requested presence information, and at operation 310, the online management module 202 presents status indicators based on the received presence information.

Figure 4:
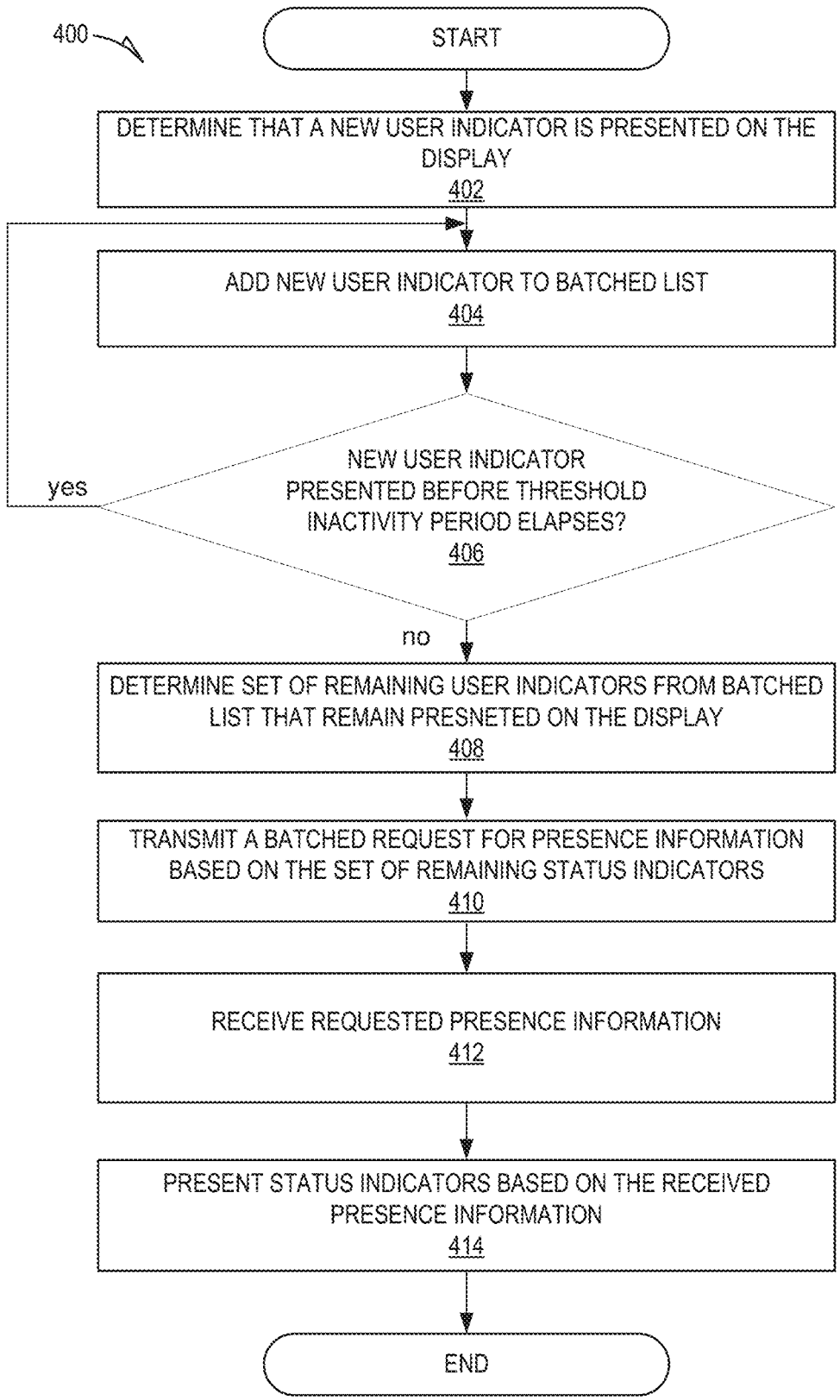
FIG. 4 is a flowchart showing an example method of generating a batched request for presence information, according to certain example embodiments.

FIG. 4 is a flowchart showing an example method 400 of generating a batched request for presence information, according to certain example embodiments. The method 400 may be embodied in computer readable instructions for execution by one or more processors such that the operations of the method 400 may be performed in part or in whole by the client-side application 108; accordingly, the method 400 is described below by way of example with reference thereto. However, it shall be appreciated that at least some of the operations of the method 400 may be deployed on various other hardware configurations and the method 400 is not intended to be limited to the client-side application 108.

At operation 402, the user identifier recording module 204 determines that a new user indicator is presented on the display. The user indicator recording module 204 monitors and records the user indicators that are presented and/or removed from the display of the client device 102. For example, the user indicator recording module 204 maintains an activity log that indicates when user indicators become present and are no longer present on the display of the client device. The activity log includes unique user identifiers assigned to the corresponding users, as well as time stamp data indicating a time when the user identifier become visible on the display of the client device 102, and time stamp data indicating a time when the user identifier was removed from the display.

At operation 404, the batching module 206 adds a new user to a hatched list. For example, the hatching module 206 adds the unique user identifier for the user corresponding to the new user identifier presented on the display.

At operation 406, the batching module 206 determines whether a new user indicator is presented before a threshold inactivity period elapses. If a new user indicator is presented before the threshold inactivity period elapses, the method returns to operation 404. Alternatively, if a new user indicator is not presented before the threshold inactivity period elapses, at operation 408, the batching module 208 determines a set of remaining user indicators from the batched list that remain presented on the display.

At operation 410, the data accessing module 208 transmits a batched request for presence information based on the set of remaining status indicators. The batched request includes the unique identifiers for the users that correspond to the set of remaining status indicators.

At operation 412, the data accessing module 208 receives the requested presence information, and at operation 414, the online service management module 202 presents status indicators based on the received presence information.

Figure 5:
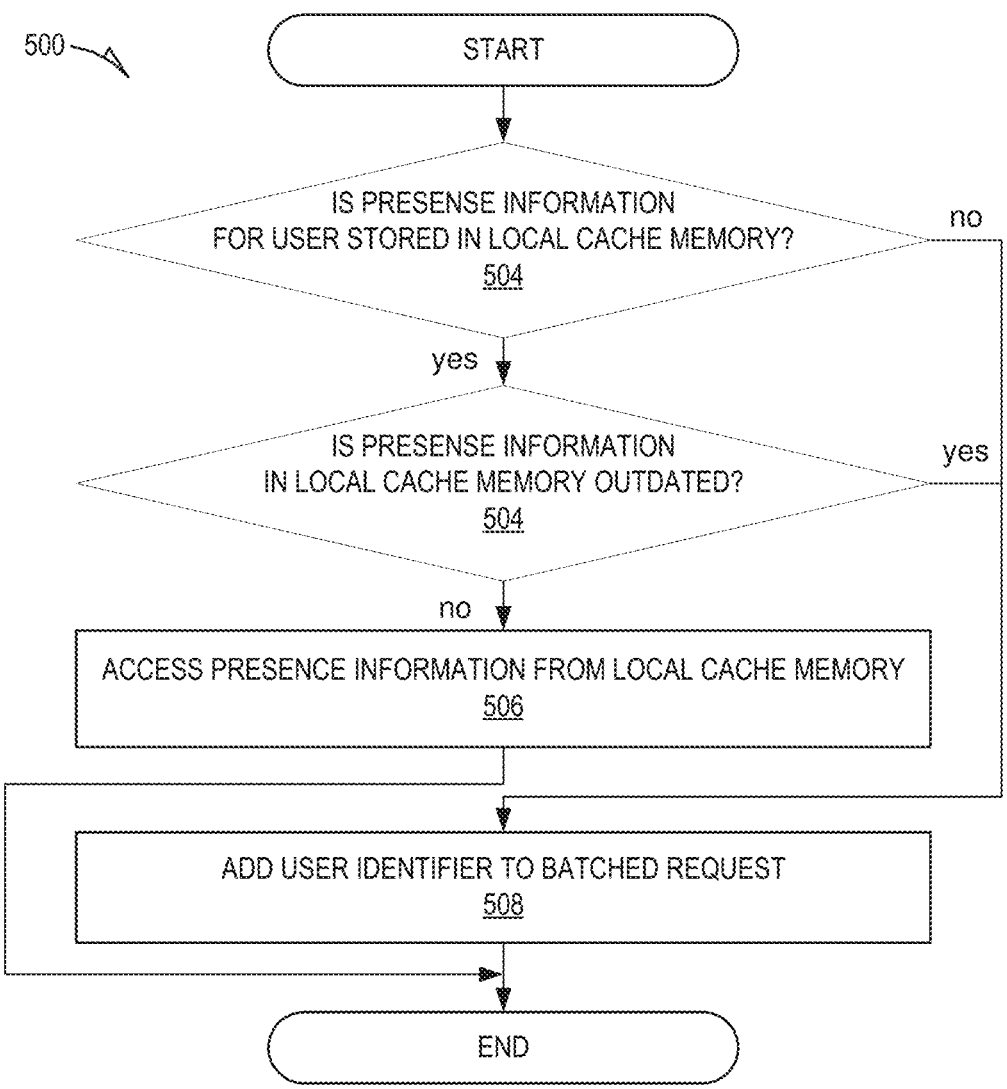
FIG. 5 is a flowchart showing an example method of using a local cache to provide presence information, according to certain example embodiments.

FIG. 5 is a flowchart showing an example method 500 of using a local cache to provide presence information, according to certain example embodiments. The method 500 may be embodied in computer readable instructions for execution by one or more processors such that the operations of the method 500 may be performed in part or in whole by the client-side application 108; accordingly; the method 500 is described below by way of example with reference thereto. However, it shall be appreciated that at least some of the operations of the method 500 may be deployed on various other hardware configurations and the method 500 is not intended to be limited to the client-side application 108.

At operation 502, the data accessing module 208 determines if presence information for a user is stored in a local cache memory 110 of the client device 102. The cache memory HO includes two parts: an in-memory cache for short term memory status, and an on-disk cache for long term memory. The in-memory cache is used to store a user's current presence status, meaning whether the user is online or offline. The on-disk cache is used to store long term presence status, such as whether the user is instantly available to receive direct messages, however this does not indicate whether the user is online/offline. The data accessing module 208 initially determines whether the user's current presence status is in the in-memory local cache memory 110. If the current presence information is not available from the in-memory local cache memory 110, the data accessing module 208 determines if the user's long term status information is available from the on-disk portion of the cache memory 110, and at operation 508, the data accessing module 206 adds the user identifier to the batched request that will be transmitted to the online service 104. The batched request will request the user's current presence information, although the user's long term presence information gathered from the on-disk portion of the local cache memory 110 (if available) is used to present a status indicator.

If the current presence information is available from the in-memory local cache memory 110, the data accessing module 208 determines whether the current presence information in the in-memory cache memory 110 is outdated. For example, the data accessing module 208 uses the timestamp data stored along with the presence information in the in-memory local cache memory 110 to determine a time at which the presence information was last updated. If the data accessing module 208 determines that the presence information has been updated within a threshold period of time, at operation 506, the data accessing module 208 accesses the current presence information for the user from the in-memory cache memory 110, rather than from the online service 104. Alternatively, if the data accessing module 208 determines that the current presence information stored in the in-memory cache memory 110 is outdated, at operation 508, the data accessing module 206 adds the user identifier to the batched request that will be transmitted to the online service 104.

Figure 6:
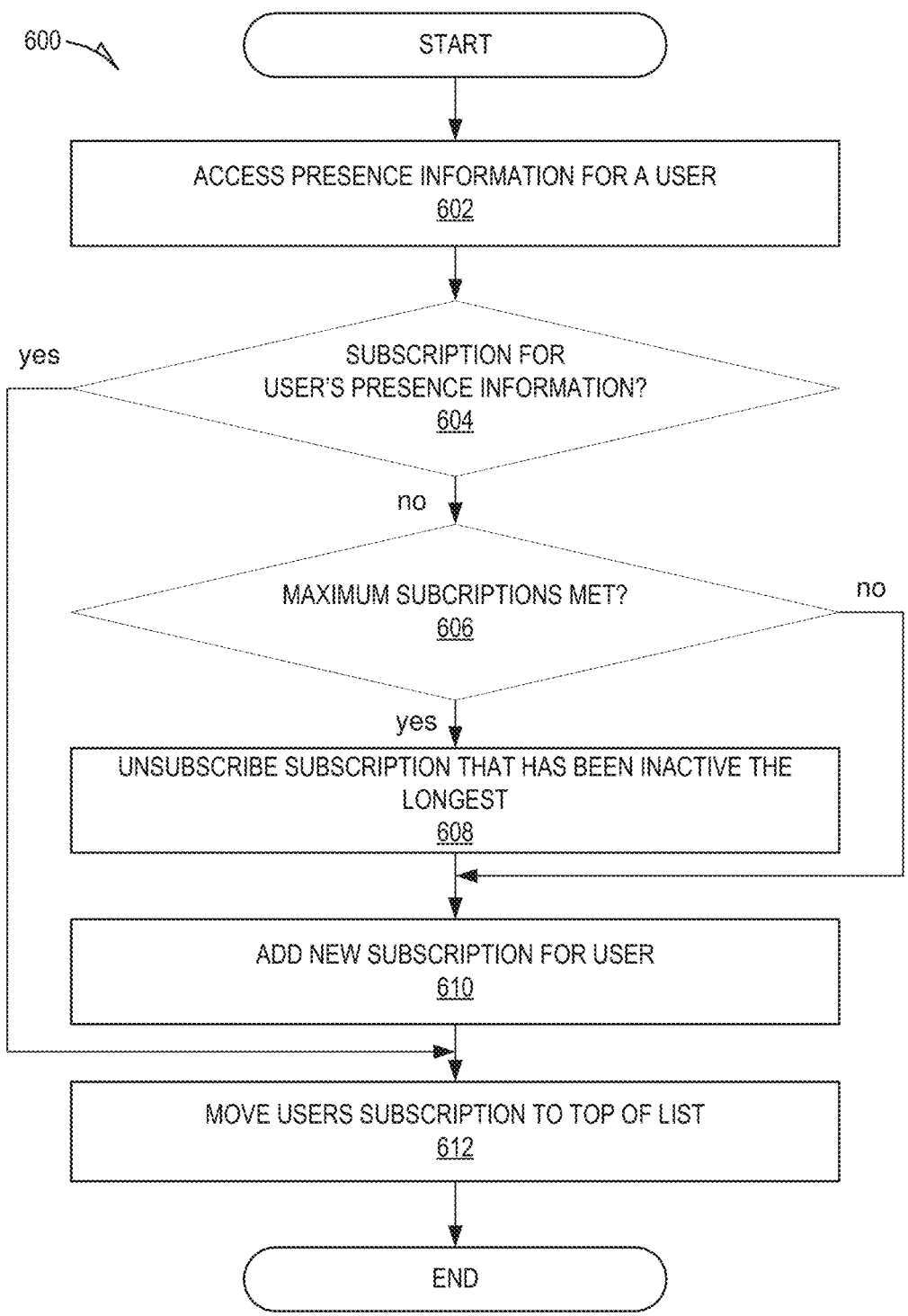
FIG. 6 is a flowchart showing an example method of managing subscriptions for real-time presence status updates, according to some example embodiments.

FIG. 6 is a flowchart showing an example method 600 of managing subscriptions for real-time presence status updates, according to certain example embodiments. The method 600 may be embodied in computer readable instructions for execution by one or more processors such that the operations of the method 600 may be performed in part or in whole by the client-side application 108; accordingly, the method 600 is described below by way of example with reference thereto. However, it shall be appreciated that at least some of the operations of the method 600 may be deployed on various other hardware configurations and the method 600 is not intended to be limited to the client-side application 108.

At operation 602, the data accessing module 208 accesses presence information for a user. For example, the data accessing module 208 accesses the presence information from the online service 104, or the cache memory 110.

At operation 604, the real-time subscription module 212 determines whether there is an existing subscription for real-time presence status updates for the user. For example, the real-time subscription module 212 searches for the user's unique identifier in the subscription listing.

If at operation 604, the real-time subscription module 212 determines that there is an existing subscription for the user, at operation 612 the real-time subscription module 212 moves the user's subscription to the top of the subscription listing. Alternatively, if at operation 604, the real-time subscription module 212 determines that there is no existing subscription for real-time presence updates for the user, at operation 606, the real-time subscription module 212 determines whether a maximum number of subscriptions is met. If the maximum number of subscriptions is met, at operation 608 the real-time subscription module 212 unsubscribes the subscription that is at the bottom of the subscription listing (i.e., the subscription that has gone the longest without being updated), and at operation 610 adds a new subscription for the user to the subscription listing. The new subscription includes the most recently updated presence information, so at operation 612, the real-time subscription module 212 moves the new user subscription to the top of the subscription listing.

If at operation 606, the real-time subscription module 212 determines that the maximum number of subscriptions is not met, at operation 610 the real-time subscription module 212 adds a new subscription for the user to the subscription listing. The new subscription includes the most recently update presence information, so at operation 612, the real-time subscription module 212 moves the new user subscription to the top of the subscription listing.

Figure 7A:
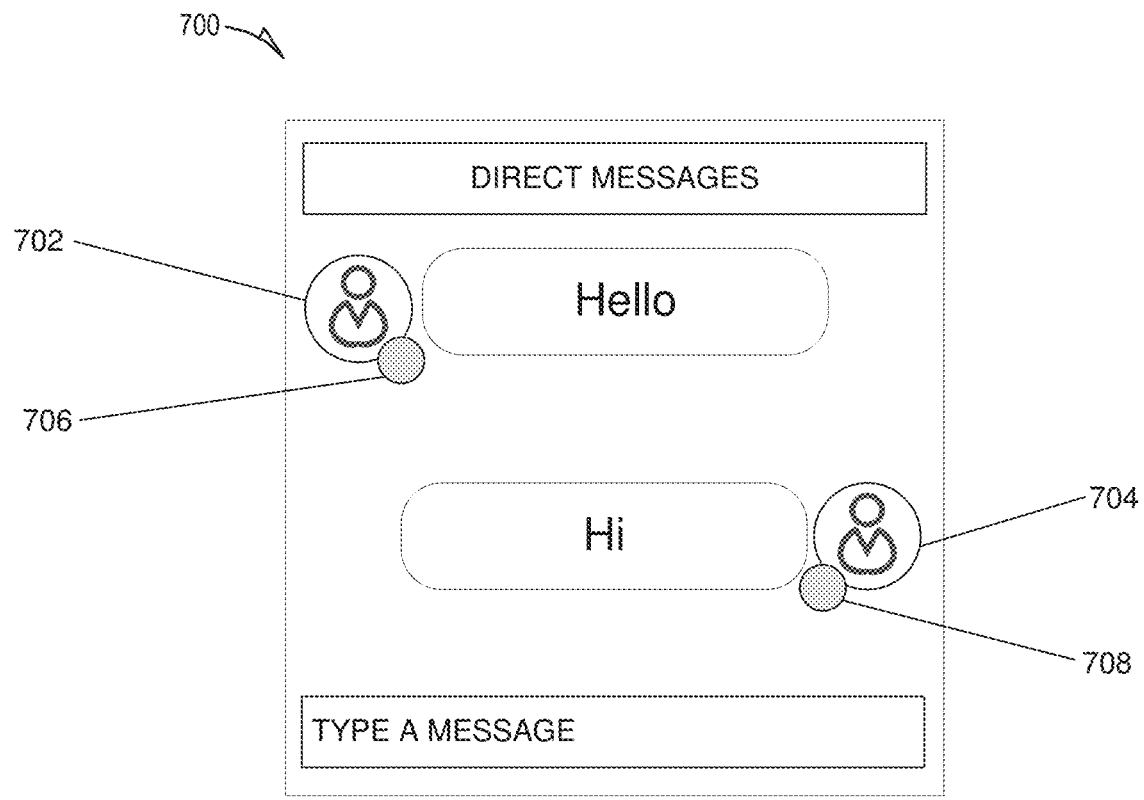
FIGS. 7A-7D are examples of screenshots including presence indicators, according to some embodiments.

FIGS. 7A-7D are examples of screenshots including presence indicators, according to some embodiments. FIG. 7A shows a screenshot 700 of a direct message conversation between two users of an online service. User indicators 702

704 are shown to identify the users participating in the conversations. As shown, the user represented by the top user indicator 702 sent the message "hello", and the user represented by bottom user indicator 704 replied with "hi."

Presence indicators 706 708 are also presented by the user indicators 702 704 to indicate the presence status of the corresponding users. For example, the presence indicator 706 next to the top user indicator 702 indicates the presence status of the user represented by the top user indicator 702. Likewise, the presence indicator 708 next to the bottom user indicator 704 indicates the presence status of the user represented by the bottom user indicator 704. The user indicators 702 704 may be different colors to represent different presence statuses. As shown, both presence indicators 706 708 are the same color, indicating that the presence status of both users is the same. A user participating in the conversation can user the presence indicators 706 708 to quickly determine the presence status of the other participants, which may encourage the user to send a new message as part of the conversation.

Figure 7B:
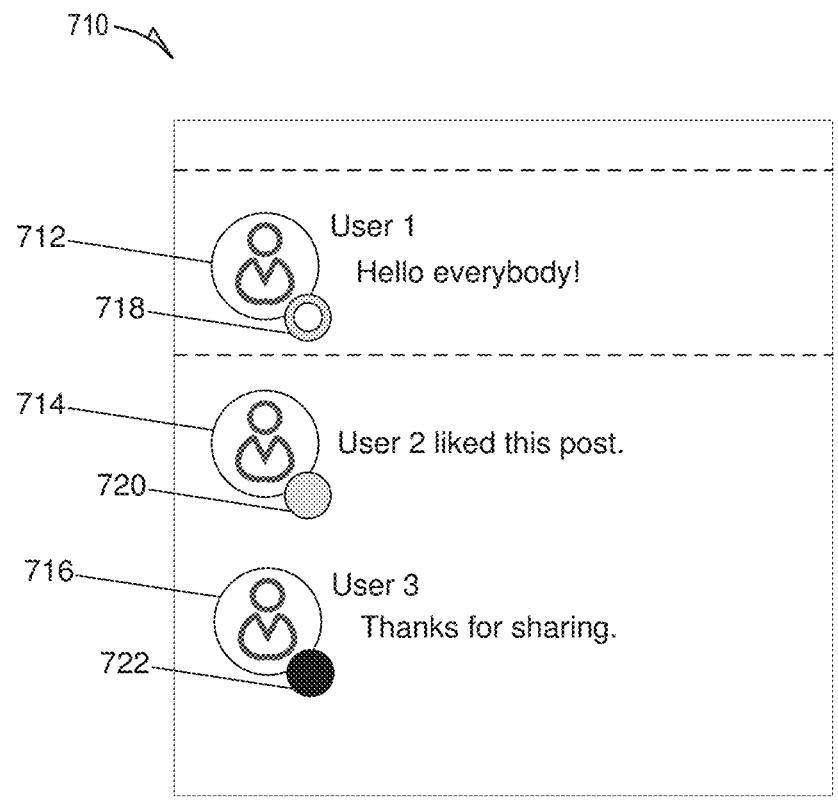

FIG. 7B shows a screenshot 710 of a message and replies posted on an online service. As shown, three user indicators 712, 714, 716 are presented along with corresponding presence indicators 718, 720, 722. The user indicators 712, 714, 716 are used to identify the user that performed the corresponding action. For example, the top user indicator 712 identifies user 1 as having posted the comment "Hello everybody!" The middle user indicator 714 identifies user 2 as having liked user 1's post. The bottom user indicator 716 identifies user 3 as having replied to user 1's comment by posting "Thanks for sharing."

The corresponding presence indicators 718, 720, 722 indicate the presence statuses of the users. As show, the top presence indicator 718 has a colored outline, which may indicate that the user is offline, but able to receive messages. The middle presence indicator 720 is colored the same color as the outline of the top presence indicator 718, and may indicate that the user is online and available to receive messages. The bottom presence indicator 722 is a different color that the other top and middle user indicators 718, 720, and may indicate that the user offline and unavailable to receive messages.

Figure 7C:
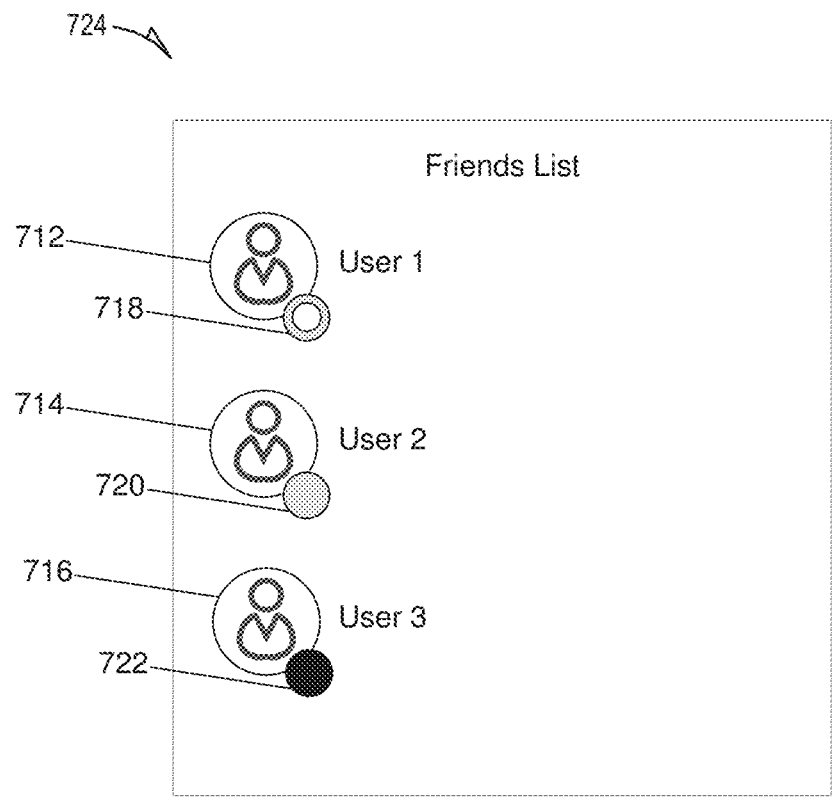

FIG. 7C shows a screenshot 724 of a friend's list (e.g., contact list) on an online service. As shown, three user indicators 712, 714, 716 are presented along with corresponding presence indicators 718, 720, 722. The user indicators 712, 714, 716 are used to identify a user's friends (e.g., connections) on the online service. For example, the top user indicator 712 identifies user 1 as being a connection, the middle user indicator 714 identifies user 2 as being a connection, and the bottom user indicator 716 identifies user 3 as being a connection.

The corresponding presence indicators 718, 720, 722 indicate the presence statuses of the users. As show, the top presence indicator 718 has a colored outline, which may indicate that the user is offline, but able to receive messages. The middle presence indicator 720 is colored the same color as the outline of the top presence indicator 718, and may indicate that the user is online and available to receive messages. The bottom presence indicator 722 is a different color that the other top and middle user indicators 718, 720, and may indicate that the user offline and unavailable to receive messages.

Figure 7D:
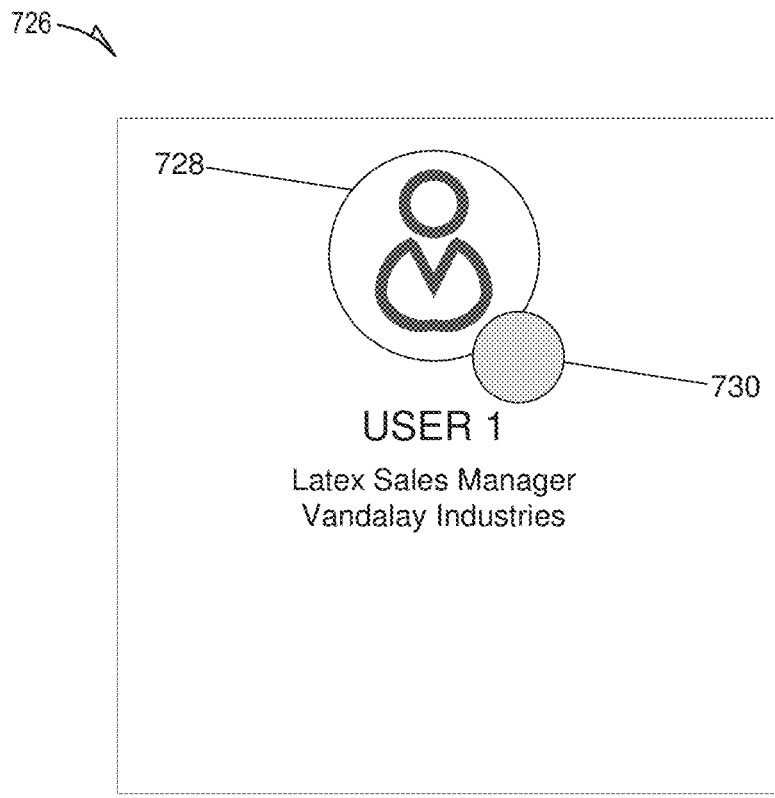

FIG. 7D shows a screenshot 726 of a user's profile on an online service. The user profile includes a user indicator 728 identifying that the user profile is for user 1. The user profile also includes a description of user 1 that identifies user as being a latex sales manager at Vandalay Industries. The user profile also includes a presence indicator 730 indicating the presence status of user 1.

Software Architecture

Figure 8:
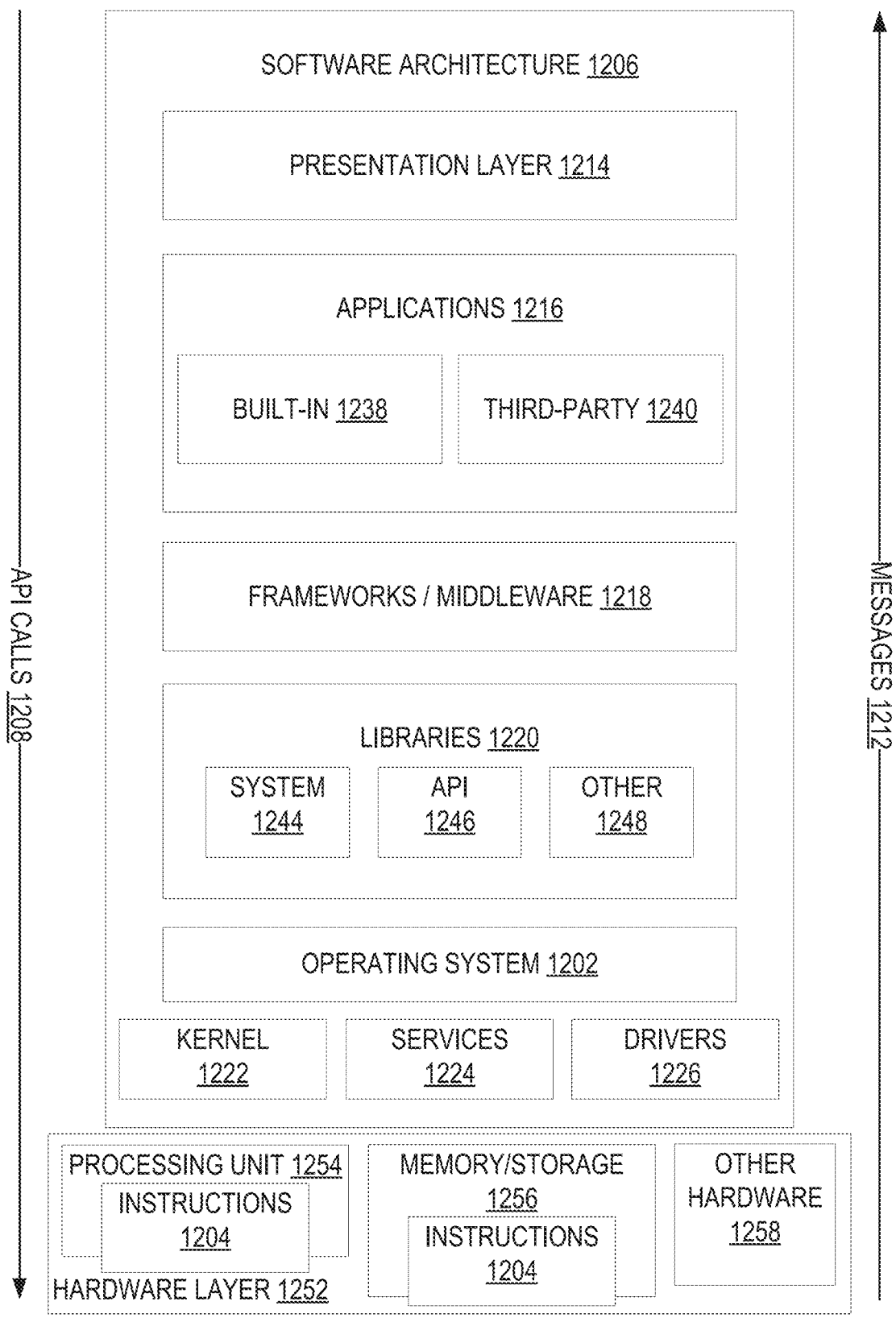
FIG. 8 is a block diagram illustrating a representative software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
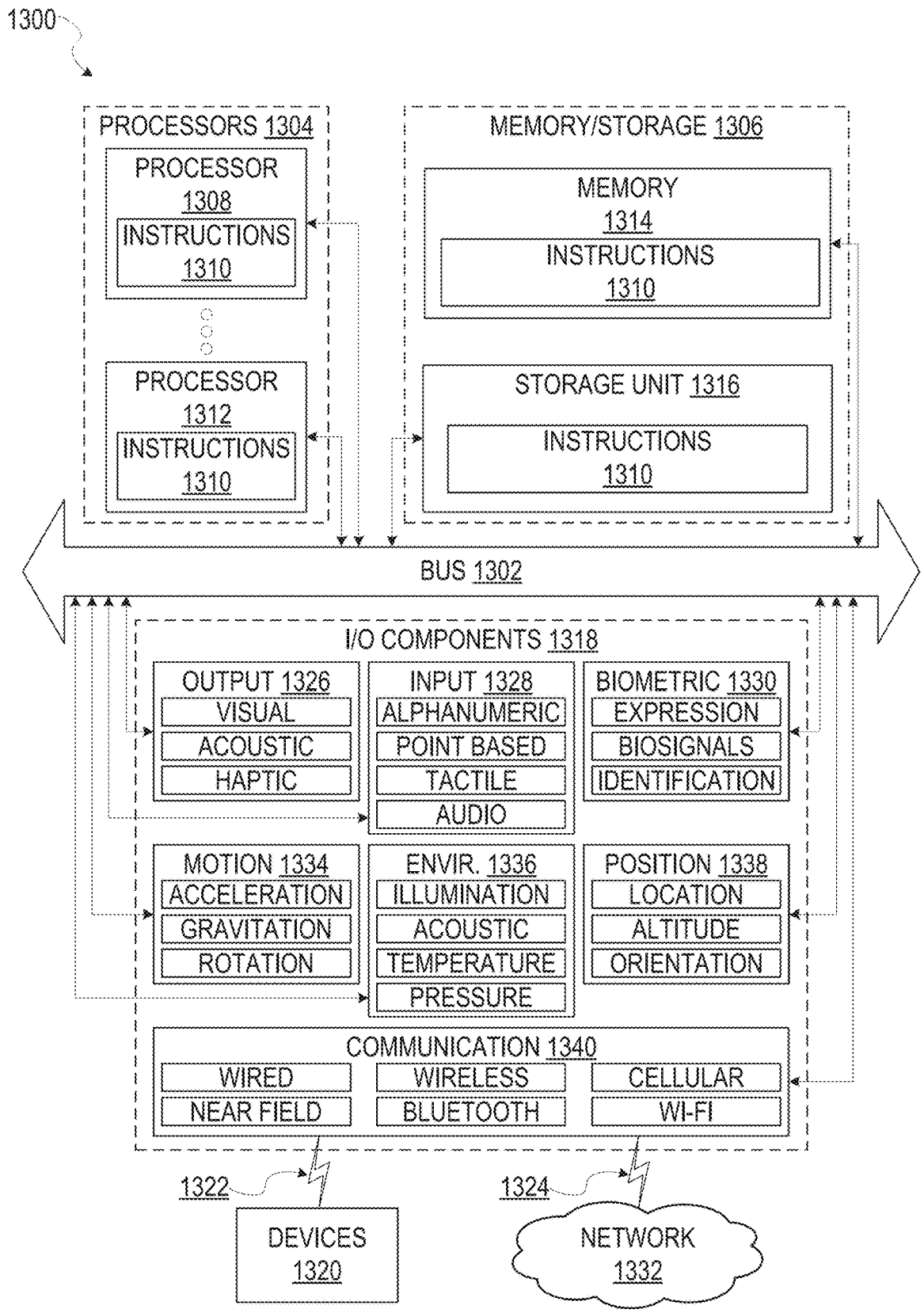
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 9:30 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (MD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF41.7, Ultra. Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 904 (sometimes referred to as "cores") that may execute instructions 910 contemporaneously.

What is claimed is:

1. A method comprising:
   determining, by a client device, a first set of user indicators that are displayed on a display of the client device at any point during a first period of time, each user indicator corresponding to a user of an online service, the first period of time beginning after a first user indicator is presented on the display of the client device, the first set of user indicators presented on the display as a result of a user of the client device viewing content provided by the online service;
   at completion of the first period of time, determining a first set of remaining user indicators that remain displayed on the display of the client device;
   determining that presence information for a first user corresponding to a first user indicator in the first set of remaining user indicators is available in a local cache memory of the client device and that presence information for a second user corresponding to a second user indicator in the first set of remaining user indicators is not available in the local cache memory of the client device;
   determining that a duration of time after which the presence information for the first user was updated in the local cache memory is less than a threshold period of time;
   presenting a presence indicator for the first user based on the presence information for the user that is stored in the local cache memory;
   transmitting, to a server associated with the online service, a request for presence information for the second user indicator from the first set of remaining user indicators, the presence information indicating a current status of each of the second user of the online service;
   receiving, from the server, the presence information for the second user of the online service; and
   presenting, based on the presence information for the second user, presence indicators indicating the status of the second user of the online service.

2. The method of claim 1, wherein the request includes unique user identifiers for the second user and a third user of the online service.

3. The method of claim 1, wherein the first set of remaining user indicators is a subset of the first set of user indicators.

4. The method of claim 1, further comprising:
   determining a second set of user indicators that are displayed on the display of the client device at any point during a second period of time, the second period of time initiated after a first subsequent user indicator that is not included in the first set of remaining user indicators is presented on the display of the client device;
   at completion of the second period of time, determining a second set of remaining user indicators that remain displayed on the display of the client device;
   transmitting, to the server associated with the online service, a batched request for presence information for a second set of users of the online service at corresponding to at least two of the user indicators included in the second set of remaining user indicators;
   receiving, from the server, the presence information for the second set of users of the online service; and
   presenting, based on the presence information for the second set of users, presence indicators indicating the status of the second set of users.

5. The method of claim 1, further comprising:
   storing, in an in-memory cache memory of the client device, current presence information for the second user; and
   storing, in an on-disk cache memory of the client device, long term presence information of the second user.

6. The method of claim 1, further comprising:
   subscribing for real-time presence updates for a third user from the first set of users, causing the server of the online service to push presence status updates for the third user to the client device.

7. A client device comprising:
   one or more computer processors; and
   one or more computer-readable mediums storing instructions that, when executed by the one or more computer processors, cause the client device to perform operations comprising:
      determining a first set of user indicators that are displayed on a display of the client device at any point during a first period of time, each user indicator corresponding to a user of an online service, the first period of time beginning after a first user indicator is presented on the display of the client device, the first set of user indicators presented on the display as a result of a user of the client device viewing content provided by the online service;
      at completion of the first period of time, determining a first set of remaining user indicators that remain displayed on the display of the client device;
      determining that presence information for a first user corresponding to a first user indicator in the first set of remaining user indicators is available in a local cache memory of the client device and that presence information for a second user corresponding to a second user indicator in the first set of remaining user indicators is not available in the local cache memory of the client device;
      determining that a duration of time after which the presence information for the first user was updated in the local cache memory is less than a threshold period of time;
      presenting a presence indicator for the first user based on the presence information for the user that is stored in the local cache memory;
      transmitting, to a server associated with the online service, a request for presence information for the second user indicator from the first set of remaining user indicators, the presence information indicating a current status of each of the second user of the online service;
      receiving, from the server, the presence information for the second user of the online service; and
      presenting, based on the presence information for the second user, presence indicators indicating the status of the second user of the online service.

8. The client device of claim 7, wherein the request includes unique user identifiers for the second user and a third user of the online service.

9. The client device of claim 7, wherein the first set of remaining user indicators is a subset of the first set of user indicators.

10. The client device of claim 7, the operations further comprising:
determining a second set of user indicators that are displayed on the display of the client device at any point during a second period of time, the second period of time initiated after a first subsequent user indicator that is not included in the first set of remaining user indicators is presented on the display of the client device;
at completion of the second period of time, determining a second set of remaining user indicators that remain displayed on the display of the client device;
transmitting, to the server associated with the online service, a request for presence information for a second set of users of the online service at corresponding to at least two of the user indicators included in the second set of remaining user indicators;
receiving, from the server, the presence information for the second set of users of the online service; and
presenting, based on the presence information for the second set of users, presence indicators indicating the status of the second set of users.

11. The client device of claim 7, the operations further comprising:
storing, in an in-memory cache memory of the client device, current presence information for the second user; and
storing, in an on-disk cache memory of the client device, long term presence information of the second user.

12. The client device of claim 7, the operations further comprising:
subscribing for real-time presence updates for a third user from the first set of users, causing the server of the online service to push presence status updates for the third user to the client device.

13. A non-transitory computer-readable medium storing instructions that, when executed by one or more computer processors of a client device, cause the client device to perform operations comprising:
determining a first set of user indicators that are displayed on a display of the client device at any point during a first period of time, each user indicator corresponding to a user of an online service, the first period of time beginning after a first user indicator is presented on the display of the client device, the first set of user indicators presented on the display as a result of a user of the client device viewing content provided by the online service;
at completion of the first period of time, determining a first set of remaining user indicators that remain displayed on the display of the client device;
determining that presence information for a first user corresponding to a first user indicator in the first set of remaining user indicators is available in a local cache memory of the client device and that presence information for a second user corresponding to a second user indicator in the first set of remaining user indicators is not available in the local cache memory of the client device;
determining that a duration of time after which the presence information for the first user was updated in the local cache memory is less than a threshold period of time;
presenting a presence indicator for the first user based on the presence information for the user that is stored in the local cache memory;
transmitting, to a server associated with the online service, a request for presence information for the second user indicator from the first set of remaining user indicators, the presence information indicating a current status of each of the second user of the online service;
receiving, from the server, the presence information for the second user of the online service; and
presenting, based on the presence information for the second user, presence indicators indicating the status of the second user of the online service.

14. The non-transitory computer-readable medium of claim 13, wherein the request includes unique user identifiers for the second user and a third user of the online service.

15. The non-transitory computer-readable medium of claim 13, wherein the first set of remaining user indicators is a subset of the first set of user indicators.

16. The non-transitory computer-readable medium of claim 13, the operations further comprising:
determining a second set of user indicators that are displayed on the display of the client device at any point during a second period of time, the second period of time initiated after a first subsequent user indicator that is not included in the first set of remaining user indicators is presented on the display of the client device;
at completion of the second period of time, determining a second set of remaining user indicators that remain displayed on the display of the client device;
transmitting, to the server associated with the online service, a request for presence information for a second set of users of the online service at corresponding to at least two of the user indicators included in the second set of remaining user indicators;
receiving, from the server, the presence information for the second set of users of the online service; and
presenting, based on the presence information for the second set of users, presence indicators indicating the status of the second set of users.

17. The non-transitory computer-readable medium of claim 13, the operations further comprising:
storing, in an in-memory cache memory of the client device, current presence information for the second user; and
storing, in an on-disk cache memory of the client device, long term presence information of the second user.

18. The non-transitory computer-readable medium of claim 13, the operations further comprising:
subscribing for real-time presence updates for a third user from the first set of users, causing the server of the online service to push presence status updates for the third user to the client device.

* * * * *

UNITED STATES PATENT AND TRADEMARK OFFICE
CERTIFICATE OF CORRECTION

PATENT NO. : 10,715,613 B2
APPLICATION NO. : 15/962027
DATED : July 14, 2020
INVENTOR(S) : Majoros et al.

Page 1 of 1

It is certified that error appears in the above-identified patent and that said Letters Patent is hereby corrected as shown below:

In the Claims

In Column 25, Line 17, in Claim 10, before "request", insert --batched--

In Column 26, Line 40, in Claim 16, before "request", insert --batched--

Signed and Sealed this
Thirteenth Day of October, 2020

Andrei Iancu
*Director of the United States Patent and Trademark Office*